United States Patent [19]

Gray et al.

[11] 4,098,927

[45] Jul. 4, 1978

[54] METHOD FOR PRODUCING FIBRE-REINFORCED THERMOPLASTIC POLYMER

[75] Inventors: George Derek Gray, Luton, England; Alastair Cox Harper, Powis, Wales; Brian William Richard Tunnicliffe, Boreham Wood, England

[73] Assignee: Imperial Chemical Industries Limited, London, England

[21] Appl. No.: 732,589

[22] Filed: Oct. 15, 1976

[30] Foreign Application Priority Data

Nov. 7, 1975 [GB] United Kingdom ............ 46208/75

[51] Int. Cl.² ................. B65C 17/00; B32B 31/00
[52] U.S. Cl. ........................ 427/195; 118/4;
118/63; 156/64; 156/356; 156/360; 156/367;
156/378; 156/381; 427/8; 427/185; 427/289;
427/356; 427/358
[58] Field of Search .............. 427/195, 289, 185, 8,
427/356, 358; 118/308, 309, DIG. 5, 4, 6, 7, 8,
36, 63; 425/141, 145; 156/64, 356, 360, 367,
378, 381

[56] References Cited

U.S. PATENT DOCUMENTS

| 2,077,492 | 4/1937 | Ritzert | 118/6 X |
|---|---|---|---|
| 3,586,560 | 6/1971 | Stranch et al. | 156/167 |
| 3,606,632 | 9/1971 | Bunish et al. | 118/308 X |
| 3,673,027 | 6/1972 | Spencer | 156/167 |
| 3,703,396 | 11/1972 | Lamanche et al. | 118/308 X |
| 3,769,883 | 11/1973 | Greve | 156/356 X |
| 3,830,638 | 8/1974 | Jumentier et al. | 118/308 X |
| 3,890,078 | 6/1975 | Straumanis | 425/141 |
| 3,931,787 | 1/1976 | Kuttner et al. | 118/308 X |
| 3,933,545 | 1/1976 | Wilkinson | 118/308 X |
| 3,940,464 | 2/1976 | Davis | 264/136 X |
| 3,986,477 | 10/1976 | Bigland | 118/6 |
| 4,019,940 | 4/1977 | Hood | 118/6 X |

Primary Examiner—Ronald H. Smith
Assistant Examiner—Shrive P. Beck
Attorney, Agent, or Firm—Cushman, Darby & Cushman

[57] ABSTRACT

A method for reducing lace breakage in a process in which a continuous roving is impregnated with a polymer powder before melting and consolidating the impregnated roving, wherein the consolidated lace tension is continuously recorded and the supply of polymer to the roving correspondingly adjusted.

11 Claims, 3 Drawing Figures

METHOD FOR PRODUCING FIBRE-REINFORCED THERMOPLASTIC POLYMER

This invention relates to a method for producing fibre-reinforced thermoplastic polymers from a continuous roving and in particular to the control of the supply of polymer in a method of producing reinforced thermoplastic laces.

BACKGROUND

The production of reinforced thermoplastic laces by using powdered thermoplastic polymers to impregnate continuous rovings of fibrous material, particularly glass fibre, is disclosed in British patent specifications Nos. 1 259 085 and 1 334 702 and U.S. Pat. No. 3 586 560 and 3 673 027. These specifications describe processes in which powdered thermoplastic is applied by various methods to the filaments making up a continuous roving and which are subsequently heated to melt the polymer. The impregnated rovings are generally pulled through forming surfaces such as dies to consolidate and remove excess polymer from the impregnated roving. The impregnated rovings produced by these processes, also known as "laces", can be cut into granule form for use in injection moulding machines. Although advantages are obtained by the use of powder impregnation as compared with the more conventional polymer melt impregnation processes it is normally found that the various processes involved in producing the finished lace result in higher tension being generated in the lace as it is pulled through the equipment used in these processes than when using the melt impregnation processes. Under the conditions operating for the major part of the powder-impregnation process, the tension in the lace will remain reasonably constant. Conditions may occasionally arise, however, for example because an excessive amount of polymer has been picked up by the roving, when the tension in the lace being hauled off can increase to such an extent that the lace breaks. Such breakage can be extremely inconvenient resulting in delays whilst the blockage is cleared and the broken lace re-threaded through the system of impregnation chamber, heating chamber, consolidation die etc to the haul-off equipment for the lace. An improved method of producing reinforced laces which reduces lace breakage arising from an increase in lace tension for any reason has now been developed.

SUMMARY OF THE INVENTION

According to the invention there is provided a method for the production of a fibre-reinforced thermoplastic lace comprising:

(a) impregnating a roving with a supply of powdered thermoplastic polymer;

(b) heating the impregnated roving in a chamber to melt the powdered polymer;

(c) drawing the roving containing molten polymer through a forming surface to consolidate the product and remove excess polymer;

(d) monitoring the tension developed in the impregnated roving; and (e) adjusting the amount of powdered thermoplastic polymer entrained with the roving before it enters the melting chamber in accordance with the magnitude of the tension in the impregnated roving so that the tension in the impregnated roving is prevented from increasing above its breaking value.

The process of the invention greatly reduces the frequency of lace breakages in the known processes and additionally permits a substantially constant pool of polymer to be maintained in the heated chamber so that a lace of uniform composition is obtained. In the absence of such a system not only is lace breakage more frequent but it may be necessary to impregnate the roving with an excess of powdered polymer to obtain a uniform composition. This results in a build-up of excess molten polymer at the consolidation die which eventually spills out of the end of the tube. Not only does this result in a lower efficiency process but it increases the possibility that the product is contaminated with degraded polymer which has been held at high temperatures for long periods.

Under most conditions of operation of the process, the control of the amount of entrained powdered polymer can be effected by continuously monitoring the tension developed in the roving and correspondingly reducing polymer concentration when the tension rises above a predetermined value and increasing the concentration when the tension falls below a predetermined value. However, in cases where a sharp increase in tension can be predicted, such as when a knot joining the ends of successive batches of the roving supply is passed through the system, it is advisable to reduce the concentration of entrained powdered polymer in anticipation of the tension increasing, until the knot is observed to have passed through the system.

The amount of powdered thermoplastic polymer entrained in the roving can be varied by varying the supply of polymer available for impregnation but it is more conveniently controlled by a process in which the supply of powder for impregnation is kept constant to give a uniform, but excess concentration of entrained powder over that required in the finished product and this excess concentration is adjusted to a lower chosen concentration by removing excess powder. Removal of excess powder may be accomplished by any convenient method, for example, by directing an air jet of variable pressure at the powder-impregnated roving prior to its entry to the melting chamber. This system readily enables the amount of powdered polymer entrained to be varied above or below the normal chosen concentration applying to steady running by control of the air jet pressure. For example, if the tension in the lace falls the air jet pressure can be reduced so that little or none of the excess powder is blown off until the tension rises to the predetermined value. Conversely, if the tension in the lace rises the air jet pressure can be increased so that the powder concentration is reduced below the chosen or predetermined condition and the tension ultimately falls to the predetermined value.

In a preferred embodiment of the invention, the means for varying the amount of powdered polymer entrained in the roving is operatively linked through a control system actuated according to the tension developed in the impregnated roving after passing through the melting chamber. When the means for varying the amount of entrained polymer is an air jet, as hereinbefore described, the air jet pressure may be continuously variable in synchronisation with the tension in the lace. Alternatively, the air jet pressure may be varied in a series of at least two steps which are triggered when the tension in the roving reaches corresponding predetermined values as monitored by the lace tension detector.

The tension developed in the lace may be measured at any stage in the process after the roving has been impregnated but preferably should be measured after the operation most likely to give rise to an increase in tension in the lace, for example, any stage in which the impregnated lace is subject to constraint such as being consolidated by a forming die. Conveniently, the tension is measured immediately prior to the equipment for hauling off the lace.

The tension in the lace may be measured by any of the known methods. Conveniently, it may be measured by passing the lace over a surface, such as a pulley, which is rigidly attached to a cantilevered beam. Deflection of the beam resulting from displacement of the surface because of the change in tension in the lace can be measured by a linear displacement transducer.

In a further modification of the process of producing fibre-reinforced thermoplastic polymers it is advantageous to provide the impregnated lace with a coating of further thermoplastic material (as disclosed in British patent specification No. 1 441 743). One of the advantages of this process is that it provides a ready method for varying the composition of the impregnated roving. For example, a variety of additives such as pigments may be added at this stage rather than at the original polymer-impregnation stage. This process greatly reduces the amount of equipment cleaning needed when a variety of grades are made on the same equipment. An even more important advantage is obtained when the laces are ultimately to be chopped into granule form for use in fabricating injection moulding articles. As disclosed in British patent specification No. 1 441 743 the overcoat of thermoplastic material greatly reduces the formation of "whiskers" in these chopped granules. By "whiskers" are meant lengths of the fibre reinforcement which protrude from the ends of the granule which have been chopped. The presence of a significant number of granules containing whiskers results in a product which does not flow easily in the hopper of an injection moulding machine.

For these reasons it is preferred to include provision for coating the impregnated roving after it has passed through the polymer melting stage of the process and through a consolidation die. The coating is conveniently applied in powdered form to the hot lace after it emerges from the consolidation die. In this way the lace is provided with a coating of powder. The applied powder must be melted before it can be spread over the lace surface as a uniform coating. This is simply achieved by passing the impregnated lace with its attached powder through a second heating chamber and a die to spread the molten polymer as a uniform coating.

This coating process can introduce further constraint on the lace being hauled off although the risk of increase in lace tension is much smaller than at the first impregnation and consolidation stage of the process. Any increase in tension arising at this coating stage may be controlled by adjusting the amount of powdered thermoplastic entrained in the roving before it enters the heating chamber immediately after the impregnation stage. Whether or not provision is made for coating the impregnated lace as described above it is preferred to situate the lace tension detector immediately before the haul-off equipment so that any increase in lace tension can be dealt with.

The invention also includes apparatus for carrying out the process of measuring the lace tension and correspondingly adjusting the amount of entrained polymer as described above.

Accordingly, there is provided an apparatus comprising a heated tube terminating in a die characterised in that a device for monitoring the tension developed in a polymer-impregnated lace which has been consolidated by drawing it through the tube and die is operatively connected to a controller which actuates means for varying the amount of entrained powdered polymer in response to the magnitude of the tension developed in the impregnated roving.

In a further embodiment of the invention, provision is made for severing the lace at a convenient point if the lace tension rises so high or so quickly that the remedial action of controlling the supply of powdered polymer is ineffective. Severance of the lace at a predetermined position in the system is preferable to random breakage of the lace because a position can be chosen for severance which causes the least possible inconvenience when re-threading the lace through the system to the haul-off equipment. Thus it is easy to feed a severed lace to the hauloff equipment if the break occurs immediately before the haul-off equipment, but can be time-consuming if the break occurs in the melting chamber after the impregnation stage.

In this embodiment of the invention, there is provided a device for severing the lace which is actuated when the tension in the lace exceeds a predetermined value. Preferably this device consists of a pair of stationary, opposed cutting blades and a means for progressively guiding the lace towards the blades as the tension in the lace increases. The lace can be progessively guided between the blades by passing the lace over a spring-loaded surface, such as a spring-loaded pulley, which moves the lace progressively towards the cutting blades as the load on the spring derived from the tension in the lace increases. By appropriate choice of the position of the spring-loaded surface relative to the cutting blades and tension in the spring, running conditions may be obtained wherein the lace passes clear of the cutting blades unless an excessive tension builds up in the lace. The conditions should be chosen so that the device is not operative until the control of the lace tension by reduction in the amount of entrained powdered polymer, as hereinbefore described, has proved ineffective.

BRIEF DESCRIPTION OF THE DRAWINGS

The invention is further illustrated with reference to the accompanying drawings in which.

DETAILED DESCRIPTION

Figure 1:
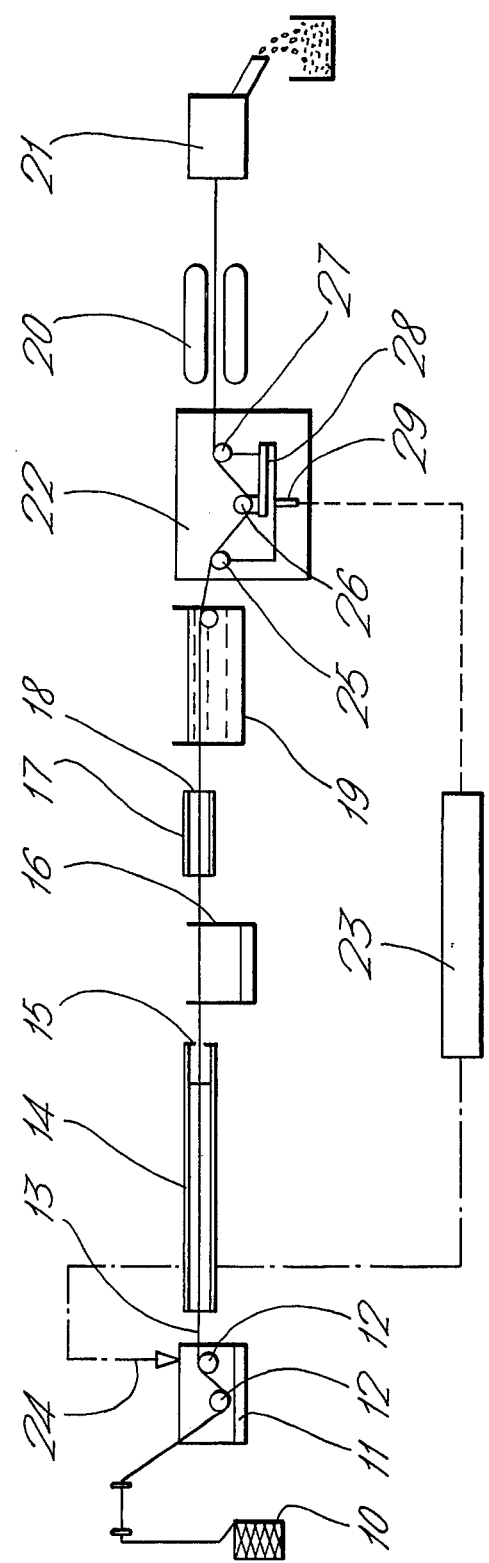
FIG. 1 is a diagrammatic view of a process for producing a fibre-reinforced lace using a tension control system according to the invention.

As shown in FIG. 1, a continuous glass roving is drawn from a bobbin 10 into a fluidised bed 11 of powdered polypropylene. Whilst in the bed 11 the roving is drawn under and over a series of bars 12. This operation separates the roving into a number of bundles of filaments and entrains the polypropylene powder between the bundles of filaments to produce a powder-impregnated roving 13 by the time the roving leaves the fluidised bed 11. This impregnated roving enters a heated tube 14 which is heated to above the melting point of the polypropylene by surrounding heaters (not shown).

The end of heated tube 14 is provided with a die 15 through which the roving containing molten polypropylene is drawn to consolidate it into a lace and remove any excess polypropylene. The consolidated lace is then passed through a powder coating tray 16 containing further fluidised polypropylene which sticks to the lace to provide a coating of powdered polypropylene. This coating is melted and made uniform by passing the lace through a heated tube 17 provided with a die 18. The lace is then cooled in a water bath 19 before passing through haul-off rolls 20 and a lace cutter 21 which cuts the lace into granules. A second and successive bobbins of glass roving are utilised by simply knotting ends of rovings together so that the process is not interrupted.

The process described in the preceding paragraph is described in more detail in and forms the subject matter of British patent specification No. 1 334 702 and British patent specification No. 1 441 743.

The present invention relates to the control of the tension in the lace which is performed using apparatus comprising a lace tension monitor represented generally by 22 situated between cooling water bath 19 and the haul-off rolls 20, a controller 23 which pneumatically controls the air pressure at a nozzle 24 in response to the magnitude of the lace tension measured by the lace tension monitor 22. The nozzle 24 is situated above the fluidised bed 11 immediately before the powder-impregnated roving enters heated tube 14. Tension monitor 22 comprises three pulley wheels 25, 26 and 27 through which the lace passes on its way to the haul-off rolls. Wheels 25 and 27 are fixed to a base plate. The middle pulley 26 which the lace passes under is rigidly attached to a cantilevered beam 28 in contact with a linear displacement transducer 29. Increasing tension in the lace causes a deviation of the cantilevered beam from a position of zero deflection relative to pulleys 25 and 27. The extent of the deviation is detected by the transducer and is a measure of the tension in the lace. The transducer transmits a signal, corresponding to the level of tension detected, to the controller 23 which in turn pneumatically controls the air pressure applied at nozzle 24 in accordance with the signal transmitted from the transducer. The pneumatic controller provides three different air pressures at the nozzle 24 activated by the signals derived when three corresponding tension values are measured by the transducer. In operation a constant excess amount of polypropylene powder is picked up by the roving in the fluidised bed 11. After a period of running, this excess polymer accumulates in the heated tube and causes the tension in the lace to increase. This tension is automatically controlled within predetermined upper and lower limits using the three levels of air pressure actuated in accordance with the magnitude of the tension in lace.

Figure 2:
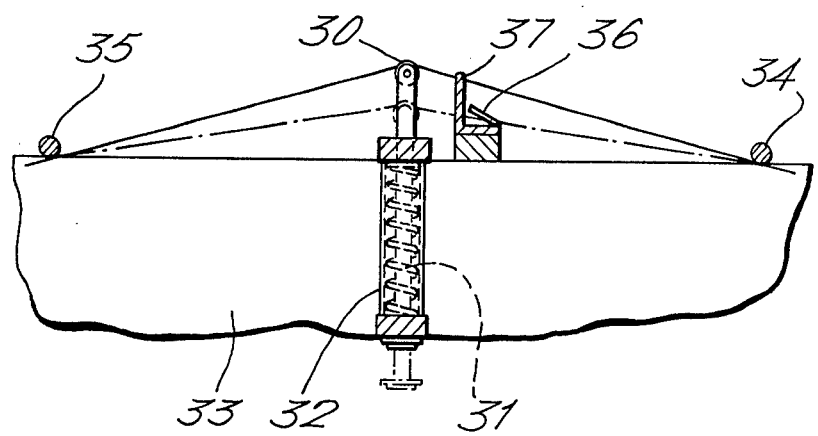
FIG. 2 is a view of a device for severing the lace according to the invention.
Figure 3:
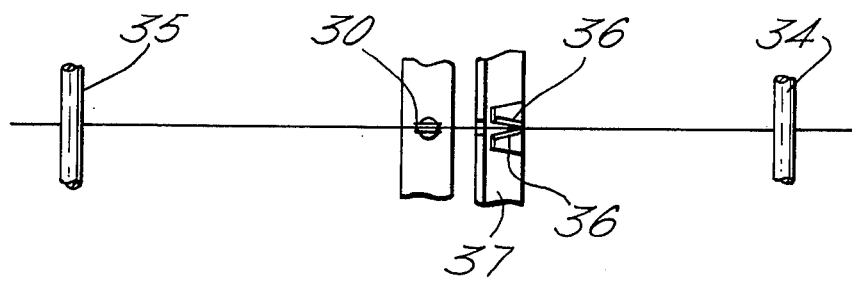
FIG. 3 is a plan view of the device of FIG. 2.

FIGS. 2 and 3 illustrate a device for severing the lace at a chosen position if the control of excessive lace tension by the method described with reference to FIG. 1 is for any reason ineffective. The device illustrated is suitably positioned between the cooling water bath 19 and the tension monitor 22 of the apparatus shown in FIG. 1. The device consists of a pulley wheel 30 over which the lace passes on its passage from water bath 19 to monitor 22. The pulley 30 is free to move against a spring 31 in cylinder 32 which is rigidly attached to a supporting base member 33. Fixed bars 34 and 35 are provided to guide the path of the lace before and after its passage over pulley wheel 30. A pair of fixed mutually opposed cutting blades 36 set in a bracket 37 are disposed to one side of the pulley wheel 30 in the direction of travel of the impregnated lace. The cutting blades are situated in relation to the pulley wheel so that if the tension in the lace increases sufficiently it will depress the spring-loaded pulley wheel 30 and bring the lace into cutting contact with the blades 36. The tension at which the lace can be severed may be adjusted by movement of the bars 34 and 35 relative to the pulley wheel 30.

The process of the invention provides an alternative method of production control to those described in published French Patent application Nos. 2 232 421 and 2 246 585 application No. 47077/73 corresponds to U.S. Pat. No. 3940464. These applications describe a method of controlling the amount of polymer input to a lace by monitoring the extent of a molten polymer pool in the region of the heated chamber, preferably using a capacitance method for monitoring the presence or absence of the pool at a suitable location in the heated chamber.

In an actual experiment using the apparatus described with reference to FIG. 1, a comparison was made between the method of the present invention and a method using capacitance control as described in U.S. Pat. No. 3933545. Over a running period of four days it was found that the number of lace breakages was reduced by a factor of 4. The amount of polymer wasted by leakage from the open ends of the tube was reduced by a factor of 20, mainly as a result of the reduced lace breakage, and the percentage of knots (joined ends of roving) which failed to pass through the die was reduced by a factor of 3.

We claim:
1. A method for the production of a fibre-reinforced thermoplastic lace comprising:
   (a) impregnating a roving with a supply of powdered thermoplastic polymer;
   (b) heating the impregnated roving in a chamber to melt the powdered polymer;
   (c) drawing the roving containing molten polymer through a forming surface to consolidate the product and remove excess polymer;
   (d) monitoring the tension developed in the impregnated roving; and
   (e) adjusting the amount of powdered thermoplastic polymer entrained with the roving before it enters the melting chamber in accordance with the magnitude of the tension in the impregnated roving so that the tension in the impregnated roving is controlled between predetermined upper and lower limits, the predetermined upper limit being below the breaking value of tension for the impregnated roving.

2. A method according to claim 1 in which the adjustment of the amount of powdered thermoplastic polymer entrained is effected by a means which is operatively linked through a control system actuated in response to the magnitude of the tension developed in the impregnated roving.

3. A method according to claim 1 in which the adjustment is effected by impregnating the roving with an excess concentration of powdered polymer over that required in the finished product and subsequently reducing this in accordance with the magnitude of the tension in the impregnated roving.

4. A method according to claim 3 in which the reduction in the excess powder concentration is accomplished by directing an air jet at the impregnated roving prior to its entry to the melting chamber.

5. A method according to claim 4 in which the pressure of the air jet is either continuously variable in synchronisation with the tension developed in the lace or is activated in a series of at least two steps which are triggered when the tension in the roving reaches corresponding predetermined values.

6. A method according to claim 1 in which the impregnated roving produced is chopped into granule form.

7. A method according to claim 1 comprising guiding the impregnated and consolidated roving progressively towards a means, located upstream from the point of tension monitoring, for severing the impregnated roving in accordance with the tension in the roving and severing the roving when the tension rises above a predetermined value which is less than the breaking value but greater than the predetermined upper limit.

8. An apparatus for producing a fibre-reinforced thermoplastic product comprising means for moving a roving along a path extending longitudinally of the roving, means for impregnating the roving with a supply of powdered thermoplastic polymer, means including a heated tube for receiving the impregnated roving and for melting the thermoplastic polymer powder, a die for consolidating the impregnated roving, a device for monitoring the tension in the impregnated and consolidated roving, said monitoring device being operatively connected to a controller which actuates means for varying the amount of powdered polymer entrained by the roving in response to the magnitude of the tension developed in the impregnated roving.

9. An apparatus according to claim 8 in which the device for monitoring tension comprises a cantilevered beam in contact with a linear displacement transducer wherein changes in the tension of the impregnated roving are detected by displacement of the beam from a zero position and the transducer transmits a signal proportional to the magnitude of the tension in the roving.

10. An apparatus according to claim 9 in which the means for varying the amount of powdered polymer entrained by the roving includes a pneumatically controlled air jet which can vary the amount of entrained polymer powder, said jet being responsive to the signal transmitted from the transducer.

11. An apparatus according to claim 8 which includes a pair of stationary, opposed cutting blades located upstream from the tension monitoring device and means for progressively guiding the impregnated roving toward the blades in accordance with the tension in the roving, the blades being positioned so that the roving is severed if the tension rises above a predetermined value.

* * * * *